United States Patent [19]

Zarifé et al.

[11] Patent Number: 4,773,892
[45] Date of Patent: Sep. 27, 1988

[54] TENSIONER FOR A TRANSMISSION BELT

[75] Inventors: Victor Zarifé, Saint-Germain Des Prés; Charles Zermati, Maurepas; Gilles Argy, La Queue en Yvelines, all of France

[73] Assignee: Hutchinson, Paris, France

[21] Appl. No.: 42,224

[22] Filed: Apr. 21, 1987

[30] Foreign Application Priority Data

Apr. 21, 1986 [FR] France .................................. 86 05697
Mar. 16, 1987 [FR] France .................................. 87 03536

[51] Int. Cl.⁴ .............................................. F16H 7/12
[52] U.S. Cl. .................................... 474/138; 267/140.1
[58] Field of Search ............... 474/110, 136, 138, 101, 474/109, 114, 115, 117; 267/140.1, 151, 221, 226

[56] References Cited

U.S. PATENT DOCUMENTS 4,458,403  7/1984  Foster ............................ 474/110 X
4,525,152  6/1985  Speer et al. ........................ 474/133

FOREIGN PATENT DOCUMENTS 10335413  7/1958  Fed. Rep. of Germany .
83/0073   3/1983  PCT Int'l Appl. .

Primary Examiner—Thuy M. Bui
Attorney, Agent, or Firm—Browdy and Neimark

[57] ABSTRACT

A tensioner is provided for a power transmission belt comprising a return spring associated with the axis of a tensioner roller co-operating with the belt to control the displacement of said roller under the action of said spring with hydraulic type means for the dampening of vibrations generated in the belt. The spring is covered with an elastomer forming a sleeve closed at one of its ends by an obturator for defining said hydraulic dampening means which comprise at least one variable volume chamber filled with a liquid and closed at one of its extremities by a dissymmetrical valve device.

10 Claims, 3 Drawing Sheets

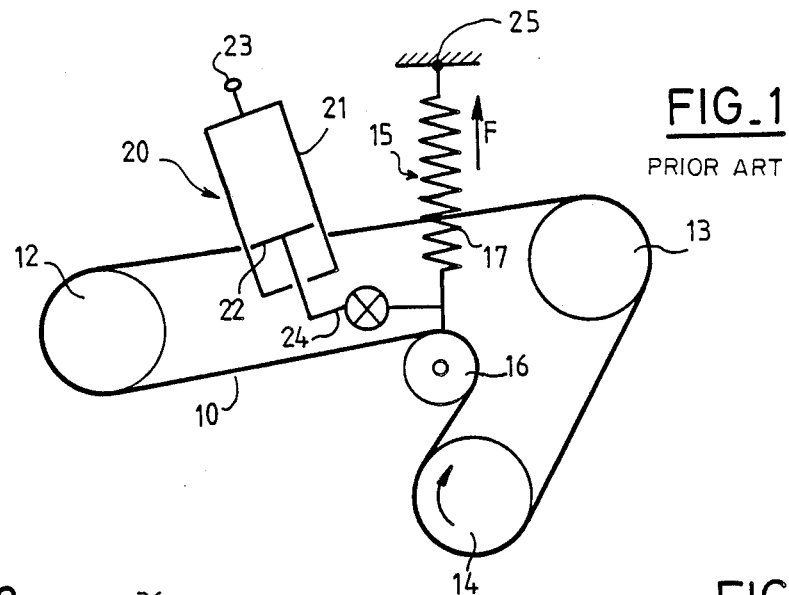
FIG_1
PRIOR ART
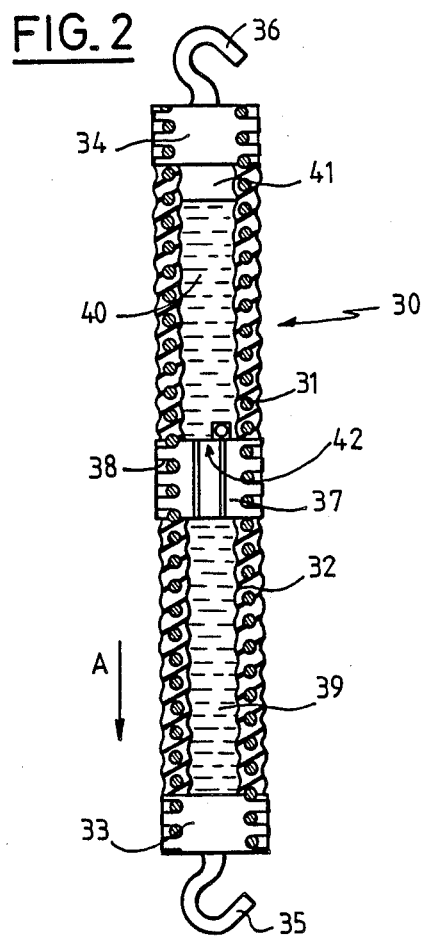
FIG_2
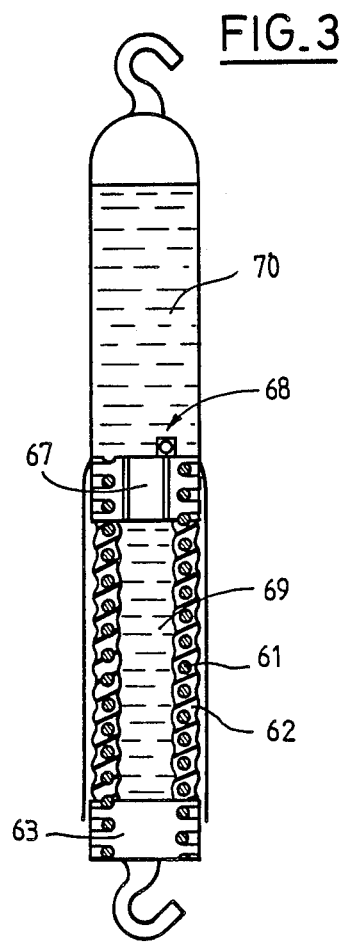
FIG_3

TENSIONER FOR A TRANSMISSION BELT

BACKGROUND OF THE INVENTION

The invention concerns a tensioner for a power transmission belt.

It is known that the transmission of power from one shaft to another using a belt, such as is used in automobiles, trucks, agricultural machines or other types of machines requires the presence of a belt tensioning device to ensure proper functioning. Indeed, any sliding of the belt with respect to the pulleys with which it co-operates inhibits the transmission of movement. Such sliding can arise from a natural stretching of the belt with use, or from differences in dimensions between belts, or from slackening in the belt tension, at the starting of the drive motor for example.

Furthermore, it is important in a power transmission system that the functioning is as regular as possible and, to this end, means are provided for damping the vibrations generated in the belt by the periodic irregularities in the motor speed, in particular during the deceleration, or on account of the jolts occuring at the starting up or stopping of the equipment integral with the shafts driven by the belt.

To satisfy the above conditions transmission belt systems have been fitted with a roller co-operating with the belt and with an axis moveable along the longitudinal length of a return spring, such a device being called a linear tensioner. The damping of vibrations is carried out by a damper, separate from the spring, usually of the hydraulic or boundary friction type and thereby attenuating the phenomenon of resonance of the tensioner spring.

In such a device, for example WO-83/00731, the spring comprises a stack of Belleville washers, and the hydraulic damper is a piston system separate from these washers, with a valve in parallel on the piston cylinder, such that the roller deflecting assembly is both heavy and cumbersome.

SUMMARY OF THE INVENTION

The object of the invention is to provide a more compact tensioner, damping vibrations generated in the belt by the periodic irregularities in the motor speed or the above mentioned jolts.

Another object of the invention is to provide a simpler, cheaper device, one more economic for industrial exploitation.

A further object of the invention is to provide a device simple to manufacture and capable of carrying out its function in static as well as dynamic conditions, and applicable to belt systems with relatively large fabrication and assembling tolerances.

A tensioner in accordance with the invention, for power transmission belts, comprising a return spring associated with the axis of a tensioner roller co-operating with the belt and thereby controlling the displacement of the roller under the action of said spring, with hydraulic means to dampen the vibrations tending to occur in the belt, the spring being coated with an elastomer forming a sleeve closed at one of its extremities by an obturator, said hydraulic damping means comprising at least one variable volume chamber enclosed by said sleeve, and filled with a liquid, said chamber being closed at one of its extremities by a valve, the passage of the liquid into and/or out of the chamber through this valve causing said damping effect.

In accordance with another feature of the invention, the elastomer, perhaps one of the many existing rubbers, is formed in such a way as to limit fatigue, preferably by ensuring that it deforms mainly by deflection.

In accordance with another feature of the invention, the valve device defining within the elastomer sleeve at least one variable volume liquid filled chamber, is arranged so that the entry of the liquid into and/or its exit from the chamber proceeds asymmetrically, the device producing therefore, a damping effect greater in one direction than in the other, thereby making possible an increase in the average tension of the belt on the appearance of the vibrations.

In order to make possible the use of a fabricating mould both simple and easy to use, and in order to obtain non-limiting rigidity features of the device, the sleeve has largely cylindrical inner and outer surfaces, and is made of an expanded rubber material.

Such a design reduces the stress on the elastomer compared with the stress on devices with sleeves in compact rubber. The use of an expanded rubber with reduced elastic modulus increases the elasticity of the material and its compressibility. An identical deformation by elongation of the spring covered with duplicate moulded elastomer produces minimum stress in the latter, thereby improving its resistance to fatigue and thereby increasing its lifetime.

In a preferred embodiment, the expanded rubber is a polyethylene chlorosulphone type material such as HYPALON for example (a registered trade mark of the DU PONT DE NEMOURS society), in which bubbles of gas have been formed during the vulcanization.

The forces coming into play in the tensioner, the displacements of these forces, their frequency and amplitude (maybe of the order of a few millimeters) lead to the generation of heat in the device, and the invention provides cooling means for example a cap or an outer skirt, ribbed so as to increase the surface of thermal exchange with the surrounding air.

Other measures can also be taken to enhance the thermal exchange, for example, by using perforated outer caps.

The invention will be better understood given the following description and with reference to the drawings, both serving as example only.

BRIEF DESCRIPTION OF THE DRAWINGS

FIG. 1 is a schematic view of a known type of belt transmission device.

FIG. 2 is a schematic view of a first embodiment of the invention.

FIG. 3 is an analogous view to that of FIG. 2 of a second embodiment of the invention.

DETAILED DESCRIPTION OF THE DRAWINGS

Figure 4:
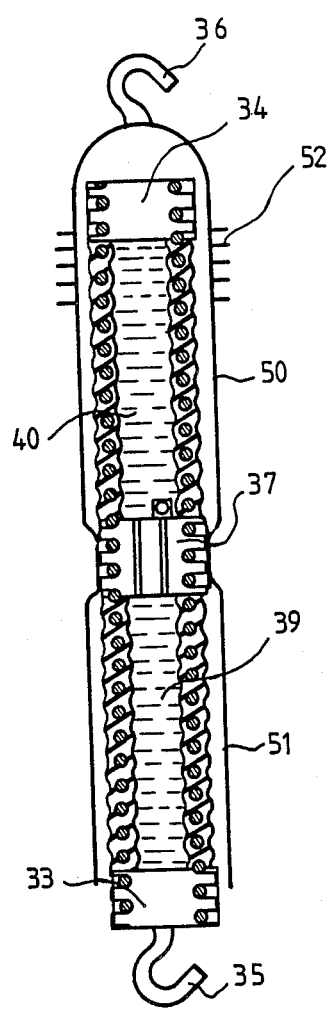
FIG. 4 is an analogous view to that of FIGS. 2 and 3 of a further embodiment.

FIG. 1 illustrates schematically a known type of transmission device. In such a device a belt 10 co-operates with the flanges of the pulleys 12 and 13 integral with an output shaft and with the flanges of a pulley 14 integral with an input shaft, for example the crankshaft of an automobile, truck, farming machine or similar motor. In order to maintain the tension of the belt 10 a tensioner 15 with roller 16 and spring 17 is connected with the device. The roller 16 is mounted so as to be moveable along the direction of the axis of the spring 17, in order to compensate for any extension of the belt 10, and thereby avoiding any slipping of the latter on the pulley flanges. In order to avoid resonance in the spring 17 and also to dampen the vibrations generated in the belt 10 by the periodic irregularities of the motor speed during deceleration or during jolts caused by the starting or stopping of assemblies driven by the shafts integral with pulleys 12 and 13, a dampener 20 with cylinder 21 and piston 22 is fixed to a point 23 and connected by a lever system 24 to the roller 16. The anchor point 23 of the dampener 20 is separate from the anchor point 25 of the spring 17 such that the juxtaposition of two distinct devices by means of levers, together with the need for two fixing points complicates the mounting of the system and also encumbers the system, leading to an increase in cost of the system.

In order to find solutions to these inconveniencies, the invention consists of a singe compact assembly, ensuring the correct tensioning of the belt and, at the same time, the dampening of the vibrations.

In accordance with a first embodiment, FIG. 2, the device 30 comprises a helical spring 31 on which is duplicate moulded an elastomer, for example the rubber EPDM, represented by the hatching in the drawing, thereby forming a roughly cylindrical water-tight sleeve closed at its extremities by the obturators 33 and 34 integral with the hook 35 or ring 36, the former intended to be directly or indirectly (for example by means of a lever) linked to the roller 16, the latter intended to be fixed to the anchor point 25. The inner volume of the sleeve 32 is divided by means of a ring 37 threaded on the outside 38, thereby co-operating with the turns of the spring 31 and separating the volume into two chambers 39 and 40 respectively, both filled with a liquid, the second chamber possibly containing in its upper part a residual volume of air 41.

The ring 37 forms one of the elements of a valve device 42, provided to control the flow of the liquid between the two chambers 39 and 40, this flow being preferably asymmetric, that is easier in one direction than in the other and therefore having an enhanced dampening effect in the direction of the arrow A, the direction corresponding to an extension of the spring 31.

Figure 6:
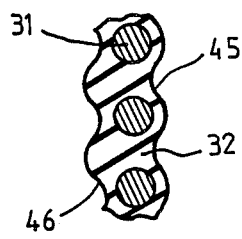
FIG. 6 is a view in detail.

The elastomer is formed on the spring 31 in such a way as to limit the dynamic deformation ratio to a predetermined value thereby reducing fatigue. In the embodiment shown in FIG. 6 the elastomer sleeve is provided with outer 45 and inner corrugations 46 corresponding to the deflection deformations of of the elastomer.

The material of the sleeve 32 is in addition chosen so as to maintain its characteristics in the range of temperatures in which the device is used. To this end, the invention provides appropriate means for increasing the thermal exchange surface with the surrounding air, thereby ensuring a better dissipation of the heat generated during use.

In this way, in the embodiment shown in FIG. 4, an embodiment similar to that shown in FIG. 2, a metal cap 50 encloses part of the device, more precisely the part lying between the obturator 34 and the ring 37, and is fixed in the vicinity of this ring 37. A skirt 51 surrounds the sleeve between the ring 37 and the region of the obturator 33. Thermal exchange is further encouraged by transverse or longitudinal ribs or fins in the cap and/or skirt 51 as shown schematically by 52 in FIG. 4 and/or providing perforations in the cap 50 or the skirt 51 to enable air to circulate in the immediate surroundings of the device.

In the embodiment shown in FIG. 3 an elastomer is formed onto the spring 61, analogous to the spring 31 of FIG. 2, thereby forming a roughly cylindrical sleeve closed at one end by an obturator 63 to which the spring 61 is fastened, and closed at its other end by a ring 67 on which the other end of the spring 61 is fastened. A valve device 68 is associated with the ring 67 to control the circulation of a liquid between the chamber 69, surrounded by the sleeve 62, and a second chamber 70 also containing a liquid but having no spring or elastomer sleeve.

Figure 5:
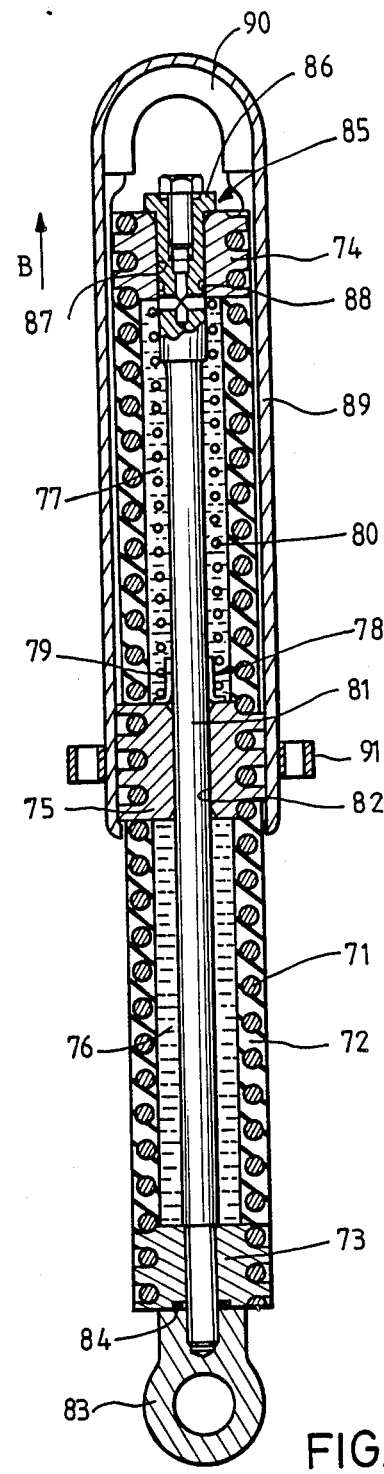
FIG. 5 is a longitudinal cut away section of a further embodiment of the invention.

In the embodiment shown in FIG. 5 the spring 71, analogous to the springs 31 and 61 of the previous embodiments, is embedded in a roughly cylindrical elastomer sleeve 72, closed at its extremities by obturators 73, 74 fixed to the extremities of the spring 71. The inner volume of the sleeve 72 is divided by a ring 75 into a chamber 76 and a chamber 77, filled with an appropriate liquid such as glycol circulating asymmetrically from one chamber to the other across a valve device 78 consisting of a calibrated ring dash pot type device acted on by the spring 80 and side mounted on a pin 81 crossing the ring 75 by means of a bore 82. At its lower extremity the pin 81 is fixed to a ring 83 attached to the obturator 73, a sealing ring 84 being interposed. The collar 86 at the head 85 of the pin 81 is fixed onto the upper face of the obturator 74, the pin 81 crossing the obturator through a bore 87 and a sealing joint 88.

In this embodiment the perforated cap, the perforations being concentrated in the region of a small arch 90 lining the end of the cap, surrounds the part of the device between the separating ring 75 and the space just beyond the obturator 74. A fastening ring 91 encircles said cap roughly in the region of the separating ring 75.

The device is fixed at the upper end by the small arch 90 and the ring 83 is integral directly or indirectly (for example by means of a lever) with a roller 16. It functions as follows: when the tension of the belt decreases the spring exerts a force in the direction of the arrow B, drawing the pin 81 and causing a flow of liquid from the chamber 76 to the chamber 77 thereby increasing the tension of the belt.

If however, the belt tension increases the tensioner reacts by a movement in the opposite direction of the ring 83 and of the pin 81 integral with the latter, provoking the displacement in the opposite direction of the arrow B of the obturator 74. The liquid in the chamber 77 passes into the chamber 76 producing a dampening effect greater than in the opposite direction. The vibrations are thereby dampened, and at the same time the average tension of the belt is increased.

Figure 7:
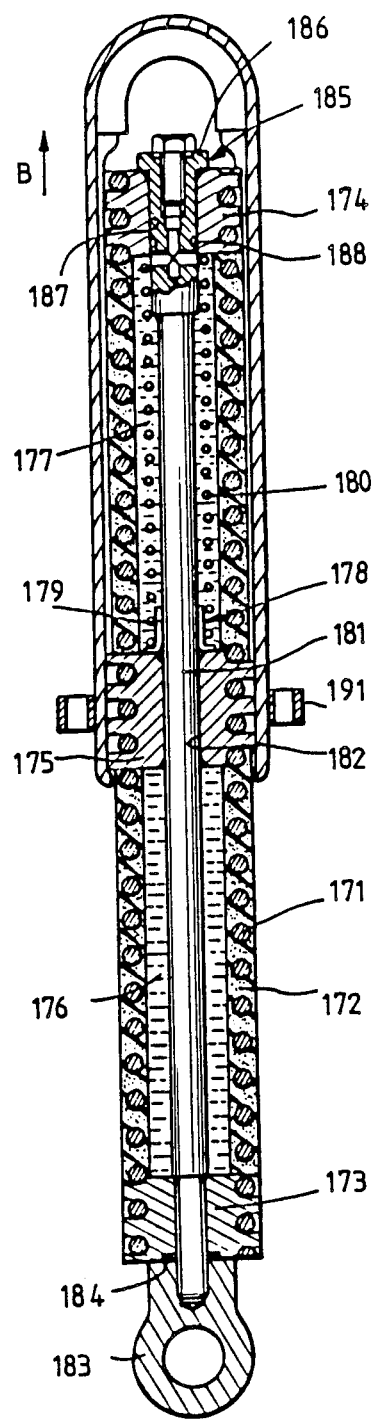
FIG. 7 is a view analogous to that of FIG. 5 but of a further embodiment of the invention.

In the embodiment shown in FIG. 7, the device comprises a helical spring 171 onto which is moulded an alveolate material for example a polyethylene chlorosulphone such as HYPALON (registered trade mark of the DU PONT DE NEMOURS society). The expanded rubber is duplicate moulded onto the spring thereby forming a sleeve 172 with a cylindrical cross section.

The inner volume of the sleeve 172 is divided by a ring 175 into a chamber 176 and a chamber 177 both filled completely with an appropriate liquid such as glycol, able to circulate asymmetrically between the two chambers by means of a valve 178 formed by a calibrated ring dash pot device 179 acted upon by the spring 180 and side mounted on a pin 181 crossing the ring 175 through a bore 182. At the lower end in the drawing the pin 181 is fixed to ring 183 attached to an obturator 173, with a sealing joint interposed, whereas at its upper end in the diagram, the head 185 of said pin forms a shoulder 186 resting on the upper face of an obturator 174. The pin is fixed to the obturator 174 and crosses it by means of a bore 187 and a water tight joint 188. The working of the tensioning device, mounted with a clamping ring 191 provided roughly at the level of the separating ring 175, is identical to that of the embodiment shown in FIG. 5, that is: on the reduction of the belt tension, the spring 171 exerts a force in the direction of the arrow B actioning the pin 181, at the same time liquid passing from one chamber 176 to the other chamber 177, thereby increasing the belt tension. The part of the sleeve 172 between the ring 175 and the ring 183 is therefore compressed. However, because of the alveolate nature of the elastomer placed around and between the spirals of the spring 171, the compressibility of said elastomer is increased and the rigidity under compression of the alveolate material is diminished compared with that of a compact rubber, the device in accordance with the invention being submitted therefore to weaker stresses consequently improving fatigue resistance and leading to a longer lifetime of the device.

Given that a tensile stress of the spring 171 between the obturator 173 and the valve corresponds to a compressive stress in the part of the spring between said valve and the obturator 174, the forming of the sleeve in an alveolate elastomer makes possible the limiting of the rigidity of the device even in the part subjected to compression, such that the extension, for a given force proportional to the rigidity, can vary in an area sufficiently large to permit the tensioner to carry out its function just as well in a static as in a dynamic regime.

Also the tension exerted by the tensioner is more stable over a greater range of distances, resulting in an increased latitude in the fabrication and mounting tolerances.

In addition, the fabrication by duplicate moulding of a cylindrical sleeve is a simplification over the fabrication of a sleeve corrugated on its inner and outer walls, no particular precautions being necessary for the positioning of the spring, the turns of which can form slight differences to the norm, in a mould.

For the fabrication the invention anticipates the addition to the elastomer composition for moulding of a swelling agent generating gas bubbles in the elastomer during the vulcanization thereby producing a vulcanized alveolate material up to 30% less dense than the compact elastomer composition. This reduced density entailing a decrease in the compression stiffness of the expanded rubber with respect to the compact rubber of a factor of the order of 6 or 7.

Smaller reductions in density can of couse be carried out to obtain smaller reductions in the stiffness. Good results have been obtained for reductions of 15% in the elastomer density.

The swelling agent incorporated in the elastomer can be a known agent, for example an agent of the type azodicarbonamide, giving good results for only small additions, of the order of 2%.

The composition of the expanded rubber is such that the sleeve conserves its improved elasticity and increased compressibility—due to the gas bubbles—in the range of temperatures in which the device is used. The device in addition comprising means to increase its surface of thermal exchange with the surrounding air to better dissipate the heat generated during the functioning.

What is claimed:

1. Tensioner for a power transmission belt associated with a tensioner roller (16) having an axis and a reference fixation point (25), said tensioner comprising:
   a return spring (32), for tensioning the belt through controlling the displacement of the roller, said spring being covered with an elastomer;
   a sleeve formed by said elastomer covered spring;
   hydraulic type dampening means for the dampening of vibrations generated in the belt, said dampening means comprising a first (39, 69) and a second (40, 70) chamber filled with a liquid, at least one of said chambers having a variable volume and being limited by at least a portion of said sleeve; and
   a valve device (67 68), between said first and second chambers, for the passage of the liquid from one of said chambers to the other and conversely, whereby said dampening is carried out.

2. Tensioner in accordance with claim 1, wherein said elastomer is a rubber formed in such a way to limit fatigue by ensuring that it becomes deformed principally through bending.

3. Tensioner in accordance with claim 1, wherein said valve device comprises an entry and an exit arranged such that the entering of the liquid to and the leaving of the liquid from one of said chambers to the other is asymmetric, the dampening effect of said hydraulic means in one direction being thus greater than in the other, thereby increasing the average tension of the belt on the appearance of vibrations.

4. Tensioner in accordance with claim 1, wherein said sleeve has inner and outer surfaces roughly cylindrical and is formed from an expanded rubber.

5. Tensioner in accordance with claim 4, wherein said sleeve is formed from a polyethylene chlorosulphone based alveolate material, with the addition of a swelling agent causing the formation of the honey-comb spacing during vulcanization.

6. Tensioner in accordance with claim 5, wherein said alveolate material is an elastomer with density 15 to 30% lower than that of the same elastomer in a compact state.

7. Tensioner in accordance with claim 1 further comprising cooling means such as a cap or external skirt, ribbed and/or provided with transverse or longitudinal fins increasing the thermal exchange surface with the surrounding air.

8. Tensioner in accordance with claim 7, wherein said skirt or cap is perforated.

9. Tensioner in accordance with claim 1 wherein each of said chambers has a variable volume, wherein said first chamber has a first obturator (73, 173), said second chamber has a second obturator (174) said return spring having two extremities respectively linked to said first and second obturator, and wherein said valve device comprises a pin (81, 181) having a first extremity integral with said first obturator and a second extremity integral with said second obturator, a calibrated ring (79, 179) slidably mounted on said pin, and a further spring (80, 180) acting on said ring, said first obturator being linked to said tensioner roller (16).

10. Tensioner in accordance with claim 9 comprising a further ring (75) dividing said sleeve into said two chambers, said chambers being filed completely with liquid.

* * * * *